United States Patent
Webb

[11] Patent Number: 5,971,847
[45] Date of Patent: Oct. 26, 1999

[54] AIRWAY VENT

[76] Inventor: Walter L. Webb, 31411—42nd Ave., Mukilteo, Wash. 98275

[21] Appl. No.: 09/032,413
[22] Filed: Feb. 27, 1998
[51] Int. Cl.⁶ .......................................................... F24F 7/00
[52] U.S. Cl. ............................ 454/290; 454/316; 454/325
[58] Field of Search ..................................... 454/290, 322, 454/325, 335, 316

[56] References Cited

U.S. PATENT DOCUMENTS

| 2,472,748 | 6/1949 | Labus . |
| 2,824,429 | 2/1958 | Zucker . |
| 3,500,739 | 3/1970 | Dry . |
| 3,938,430 | 2/1976 | Koppang . |
| 5,334,091 | 8/1994 | Shih-Chin . |
| 5,370,576 | 12/1994 | Krofchalk . |

Primary Examiner—Harold Joyce
Assistant Examiner—Derek S. Boles
Attorney, Agent, or Firm—Christensen O'Connor Johnson & Kindness PLLC

[57] ABSTRACT

The present invention is a heating and cooling airway vent (12) that provides improved airflow directional control and is easier to manufacture, assemble, and install in building airway systems. The airway vent (12) includes a housing (14) having a number of fixed louvers (16) as well as a plurality of rotatable circular openings (18) in which circular inserts (20) are rotatably mounted. The circular inserts include curved louvers (22) that are angled with respect to the vertical and that are curved slightly outward. The circular inserts (20) can be rotated to direct their louvers (22), and hence the issuing air, in any desired direction. The circular inserts (20) are snap-locked into the housings (14). The vent (12) includes one or more dampers (26) operated by a damper switch (28). The damper switch (28) is connected to the housing using a guide slot (46) having ridges (48) that aid a user in keeping the damper switch (28) in a particular position. The vent housing (14), the circular inserts (20), and dampers (26) are all injection molded of a suitably rigid plastic.

12 Claims, 6 Drawing Sheets

AIRWAY VENT

FIELD OF THE INVENTION

The present invention relates to air supply registers; and more particularly, to floor, wall, and ceiling vents for use in forced air heating and cooling systems in buildings.

BACKGROUND OF THE INVENTION

Vents are currently available in various configurations. One such configuration is described in U.S. Pat. No. 2,472,748 to inventor Labus. In this patent, circular grills are positioned in openings in a front plate. The grills are formed from flat sheet metal. Each grill includes flat blades that appear to be integrally formed between an annular circumferential flange and that are oriented at an angle. The grill flange is supported in its respective opening by small tab-like flanges. The front plate and flanges also appear to be formed from sheet metal. In an alternative embodiment, each grill is supported by a shaft that is oriented perpendicular to the plane of the grill below its underside surface and connected to a rod which is further supported by a flange. The flange is attached to the underside surface of the front plate. Neither embodiment includes a damper or other mechanism for partially or totally restricting air flow.

There are a number of disadvantages to this type of vent. Sheet metal components are inherently hard to manufacture and can be expensive and time consuming to assemble. Further, because sheet metal rusts, over time, the circular grills of Labus will likely become frozen in position or, at least, difficult to adjust. In addition, vent configurations, such as Labus, that use flat blades to deflect air flow often do not provide optimal airflow directional control. When exiting air hits the angled blades, it tends to bounce off at an angle equal to its angle of incident. If the blades are angled significantly from vertical, there is a tendency for the airflow to then bounce off of the adjacent blade in the opposite direction, thus defeating the directional flow control goal of the directional blades.

A need exists for an improved vent that includes a grill as well as a mechanism that allows airflow to be partially or completely closed off. The optimal vent would also include improved airflow directional control by allowing the blades to move in a 360 degree circle and by effectively angling the airflow away from vertical. Such an ideal vent should be formed of a minimal number of elements, easy to manufacture, easy to install, and cost effective to assemble. The present invention is directed to fulfilling this need.

SUMMARY OF THE INVENTION

In accordance with the present invention an airway vent that has improved airflow directional control and is easy to manufacture and assemble is provided. In one embodiment described herein, the vent includes a rectangular housing, a damper switch, and at least one damper. The housing includes a front plate with a switch slot located near one end, and a flange extending normally from the front plate and including a guide slot having a plurality of ridges. The damper switch includes an upright plate with a finger tab extendable through the switch slot and at least one guide positionable in the guide slot. The damper is rotatably connected between opposed housing flanges and movably connected to the upright plate. The damper switch preferably includes a damper pin slot and the at least one damper includes an end plate and a pin located radially outward on the end plate, the pin being in movably engaged with the damper pin slot. Tile vent is opened and closed by operation of the finger tab and is held in distinct positions by location of the guide in the guide slot between adjacent ridges.

In accordance with other aspects of this invention, the vent includes two or more openings and corresponding inserts. In one embodiment, the opening and corresponding inserts are circularly shaped. In an alternative embodiment, the opening and corresponding inserts include multiple linear sides. There are preferably two dampers, each damper having a flat planar body.

In accordance with further aspects of this invention, an airway vent is provided including a housing, at least one insert, at least one damper, and a damper switch. The housing includes a front plate having at least one opening, a switch slot, and a flange extending outward from the front plate. The damper switch has a finger tab extending through the switch slot. The at least one insert snap-locks into the at least one housing opening. The vent is opened and closed by operation of the finger tab.

In accordance with still other aspects of this invention, an improvement to an airway vent having a housing, a circular opening in the housing, and a circular insert engagable within the opening is provided. The improvement includes at least one detent formed in one of the circular opening and the insert, the detent extending toward the other of the opening and the insert, and a plurality of notches located in the other of the opening and the insert. The notches are engagable with the at least one detent. During use, the insert may be rotated within the opening such that the detent snaps from notch to adjacent notch. The detent is preferably located in the circular opening and the plurality of notches is located about the perimeter of the circular insert. In one embodiment, the detent is formed as a small tab at one end of an arcuate piece, the other end of the arcuate piece being attached to the one of the circular opening and the insert, the arcuate piece acting as spring during rotation of the insert.

In accordance with still further aspects of this invention, components of an airway vent formed in accordance with this invention, i.e., the housing, the circular inserts, the damper switch and the dampers, are injection molded plastic elements.

In accordance with yet other aspects of this invention, an improvement to a vent having a housing, an opening in the housing, and an insert positionable over the opening, is provided. The improvement includes a plurality of louvers located in the insert, the louvers having a curved cross-sectional shape and a non-zero angular orientation relative to the upright direction of the vent. In one embodiment, the louvers are positioned at an angle in the range of about 10 degrees to 50 degrees from vertical.

In accordance with yet further aspects of this invention, a preferred heating and cool air vent is provided including a housing, a number of circular openings in the housing, a plurality of rotatable circular inserts snap-locked into the housing openings, at least one damper rotatably connected to the housing, and a damper switch. The housing includes a front plate having a switch slot and a flange. Each housing opening has at least one detent and each insert includes a plurality of notches engagable with the at least one detent during use. Each insert includes a plurality of louvers having a curved cross-sectional shape, each louver being angularly positioned relative to the upright direction of the vent. The damper switch has a finger tab extending through the switch slot.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
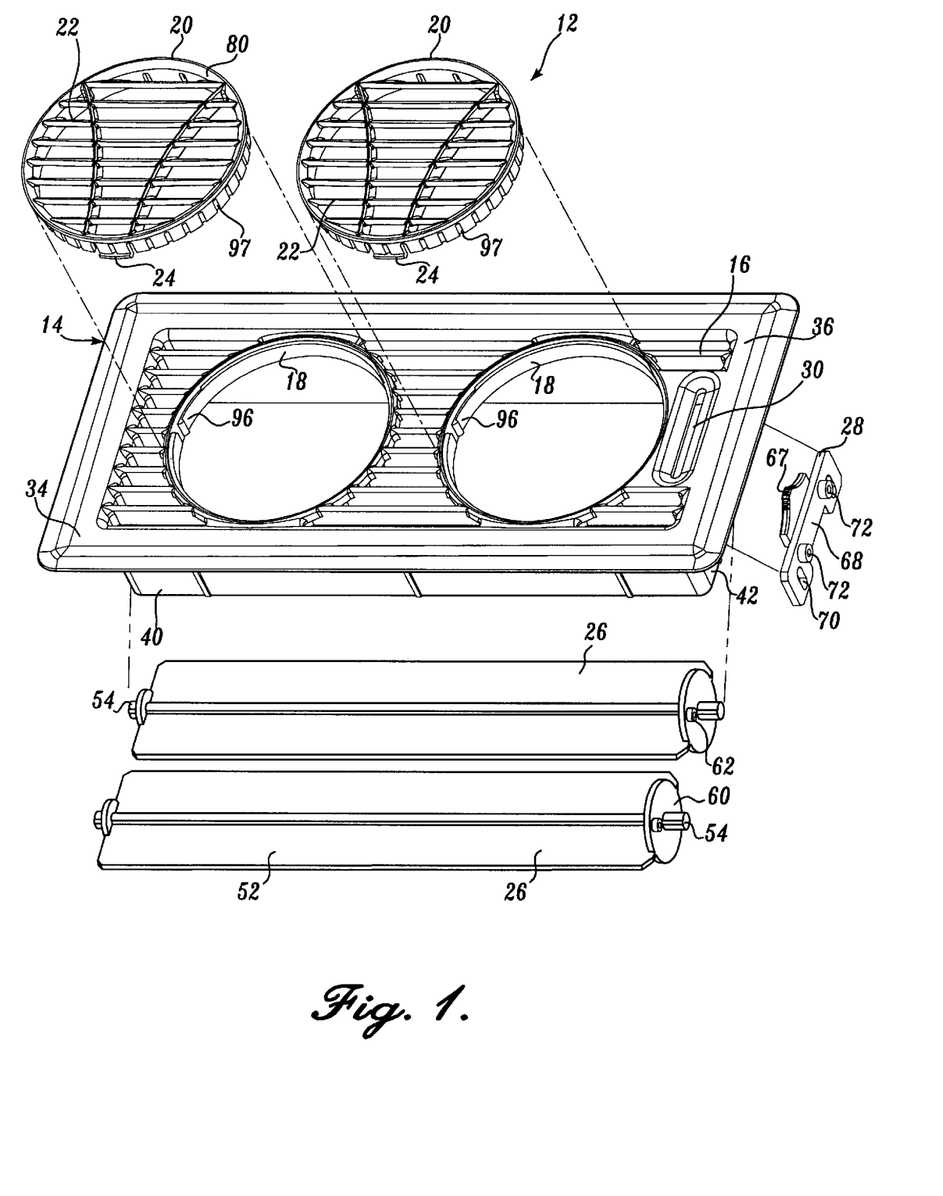
FIG. 1 is an exploded perspective view of an airway vent formed in accordance with the present invention.

Referring to FIG. 1, the present invention is an airway vent 12 that provides improved airflow directional control and that is easier to manufacture and assemble. Vents formed in accordance with the present invention may be used successfully in ceilings, walls, or other locations at which a vent airway is either drawing or expelling air.

The vent 12 includes a housing 14 sized to fit standard vent airway openings. The housing includes a number of fixed louvers 16 as well as a plurality of openings 18 in which inserts 20 are rotatably mounted. The inserts 20 include curved louvers 22 that are angled away from the vertical and that are, as a whole, also curved slightly outward. The inserts 20 can be rotated to direct their louvers 22, and hence the issuing air, in a desired direction. In one embodiment described below, the inserts 20 are circular and include a pair of protruding prongs 24 located on opposite sides of the insert circumference. The prongs 24 allow the circular inserts to be snap fit into the housings openings 18. The airway vent 12 also includes one or more dampers 26 that are operated by a damper switch 28. The damper switch 28 extends out of the housing through a switch slot 30. The damper switch is connected to the housing 14 and the dampers 26 as described in detail below.

Figure 5A:
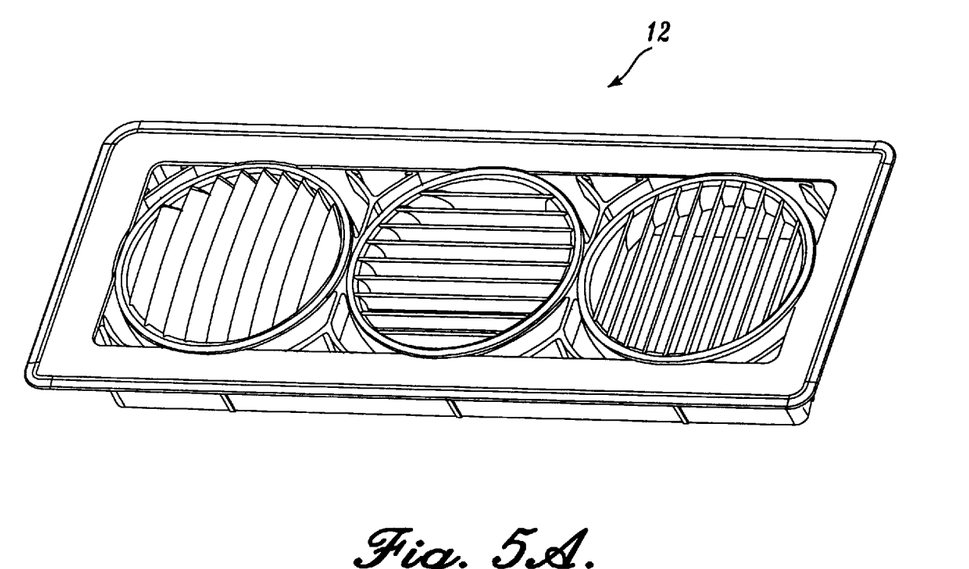
FIG. 5A and 5B are perspective views of alternative embodiments of vents formed in accordance with the present invention.
Figure 5B:
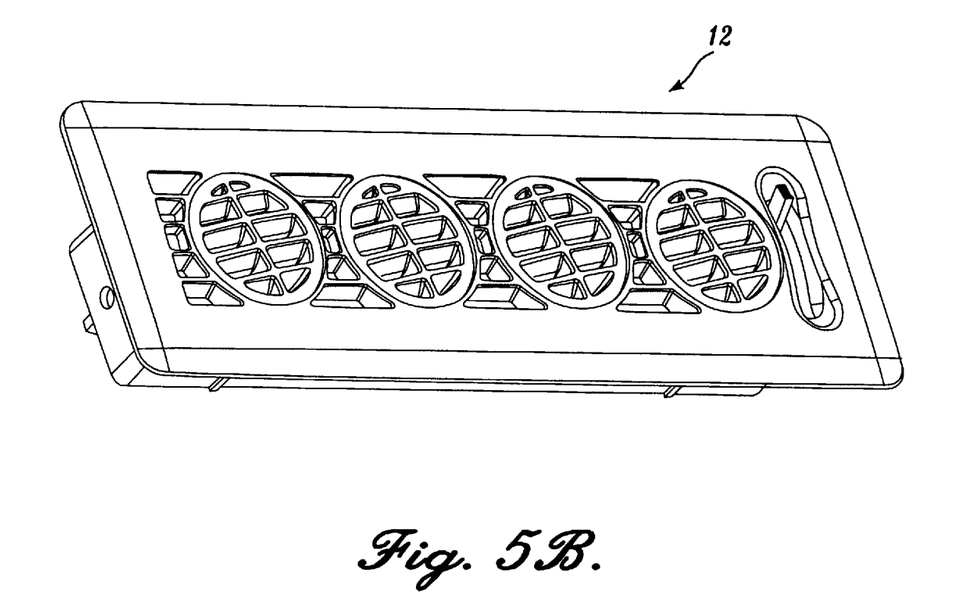

The vent embodiments described with reference to FIGS. 1, 2, and 5C include two openings and two dampers. Other numbers of openings and dampers may be used, however, depending on the particular application and the space available. See for example, the three vent embodiment of FIG. 5A, the four vent embodiment of FIG. 5B, or the single damper embodiment of FIG. 5B.

Figures 2A, 2B, 2C:
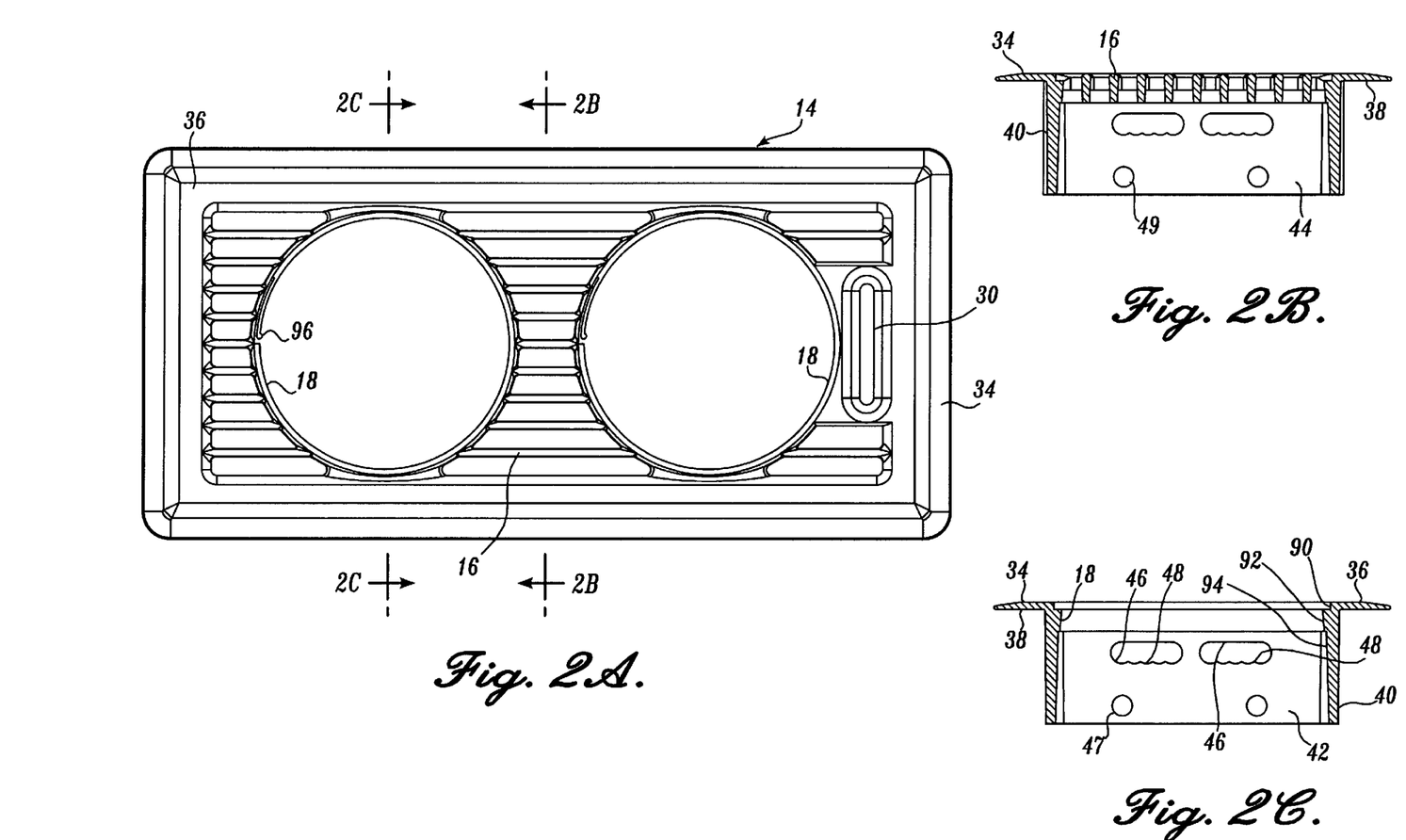
FIG. 2A is a top down plan view of the housing shown in FIG. 1.
FIG. 2B is a cross-sectional view taken along line 2B—2B in FIG. 2A.
FIG. 2C is a cross-sectional view taken along line 2C—2C in FIG. 2A.

Referring to FIGS. 2A–2C, the housing includes a substantially flat, rectangular front plate 34 having an exterior surface 36 and an interior surface 38. The openings 18 are formed in spaced apart relation in the front plate. A flange 40 extends perpendicularly outward from the front plate interior surface slightly inwardly from the outer edge thereof. Thus, a support lip is located between the flange 40 and the edge of the front plate 34. The flange 40 includes proximal and distal flange ends 42, 44.

The housing is a single piece of suitably rigid injection molded plastic. The housing includes a number of fixed louvers 16 oriented in a straight upright manner. Referring particularly to FIGS. 2B and 2C, the proximal and distal flange ends include opposed holes 47, 49, respectively, for use in connecting the damper to the housing as described below. The proximal flange end member 42 additionally includes a pair of guide slots 46 for use in guiding the damper switch 28. Each guide slot is generally horizontally formed and includes ridges 48 along one longitudinal slot edge surface. The slots 46 are identical in the number ridges that they include and the placement and size of the ridges.

Figures 3A, 3B:
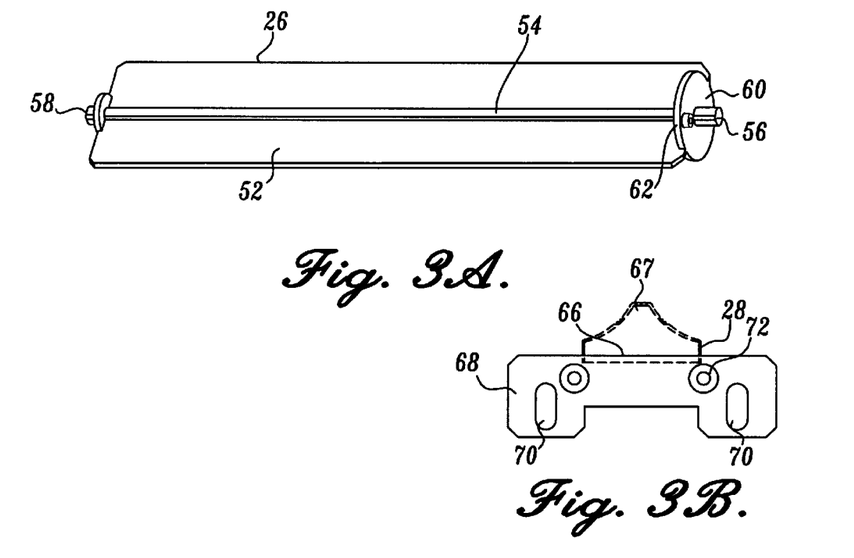
FIG. 3A is a perspective view of the damper shown in FIG. 1.
FIG. 3B is an end view of the damper switch shown in FIG. 1.

Referring to FIG. 3A, each damper 26 includes an elongated planar body 52 having a longitudinal axial shaft 54 formed in the body. The dampers shafts 54 have proximal and distal ends 56, 58. The total length of the shaft 54 is slightly longer that the distance between the proximal and distal flange ends 42, 44. Each damper shaft is connected to the housing by placing the damper shaft proximal end 56 in the hole 47 in the flange proximal end 42 and then bending the damper slightly to fit the damper shaft distal end 58 in the hole 49 in the flange distal end 44. A circular flange 60 is located at the damper shaft proximal end 56 and is oriented so that its axis is coincident with the axis of the damper shaft 54. A pin 62 spaced apart from the axis of the damper shaft 54 extends outwardly from the outer face surface of the flange 60. Each damper (including the link arm 60 and pin 62) is also formed as a single piece of a suitably rigid injection molded plastic.

Referring to FIG. 3B, the damper switch 28 includes an upright plate 68 from which a finger tab 66 extends upwardly. The finger tab 66 has a roughened upper surface 67 for ease of operation. The finger tab 66 is positioned and sized to fit through the front plate switch slot 30. Located at either end of this upright plate 68 is a vertical damper pin slot 70 configured to accommodate the pin 62 of a damper 26. The upright plate also includes a pair of guides 72 insertable into the flange proximal end guide slots 46. During installation, the finger tab 66 is inserted into the housing switch slot 30 and the guides 72 are inserted into the guide slots 46 prior to the dampers being installed in the manner described above. More specifically, after the damper switch is mounted, the damper shaft proximal ends 56 are placed in the holes 47 in the flange proximal end 42. The positioning is such that the damper pins 62 extend into the damper pin slots 70. Thereafter, the damper shaft distal ends 58 are snapped into the holes 49 in the flange distal end 44. As with the other components, the damper switch, including the upright plate 68, the finger tab and the guide 72 is formed of a single piece of suitably rigid injected molded plastic.

Figure 3C:
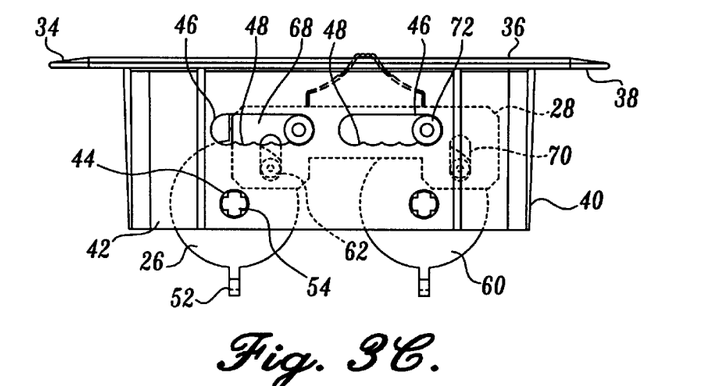
FIG. 3C is an end view of the vent shown in FIG. 1 showing the damper switch and the dampers in an open position.

Referring particularly to FIG. 3C, in an open vent position, the finger tab 66 is positioned all the way to one end of the front plate switch slot 30. When the dampers 26 are in their open position, the maximum amount of air is allowed to pass through the vent 12. In this position, the damper bodies 52 are substantially vertical, and the damper pins 62 are positioned in the damper switch pin slots at an angle of about 45 degrees clockwise from vertical.

Figure 3D:
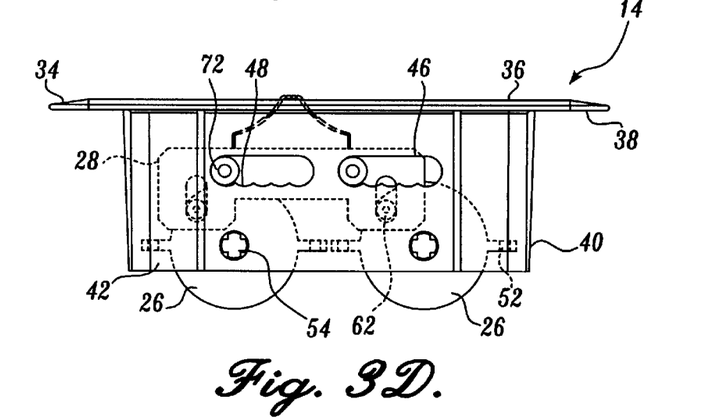
FIG. 3D is an end view of the vent shown in FIG. 1 showing the damper switch and the dampers in an closed position.

Referring particularly to FIG. 3D, the vent is in a closed position when the finger tab 66 is moved to its opposite extreme position in the front plate switch slot 30. In this position, the damper bodies 52 are generally horizontal, covering almost the entire vent front plate opening area and thus effectively preventing air flow through the vent 12. The vertical orientation of the pin slots 70 allows the damper pins 62 to rotate freely in a counter clockwise direction about the damper shaft 54. As shown, in this damper position, the orientation of the pins is about 45 degrees counter clockwise from vertical.

As will be appreciated from a reading of the above, the damper upright plate 68, the guides 72, and the guide slots 46 effectively transform the linear motion of the damper switch into circular motion of the dampers, with the damper circular links 60 and pins 62 acting similar to bell cranks. The finger tab 66 can be positioned in-between the foregoing extreme positions. In-between positions are defined by the slot ridges 48. More specifically, the dampers are latched in the inbetween positions by locating the switch guides 72 in one of the depressions located between a pair of slot ridges 48. The size of the ridges 48 and the slots 46 is such that the switch guides 72 snap over each ridge into the cradle formed between ridges. This provides the user with tactile and slight auditory feedback when moving the damper between open and closed positions.

Figure 4A:
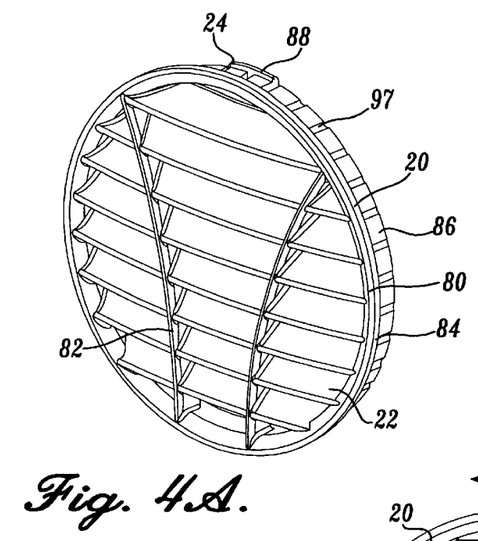
FIG. 4A is a perspective view of the grill shown in FIG. 1.
Figure 4B:
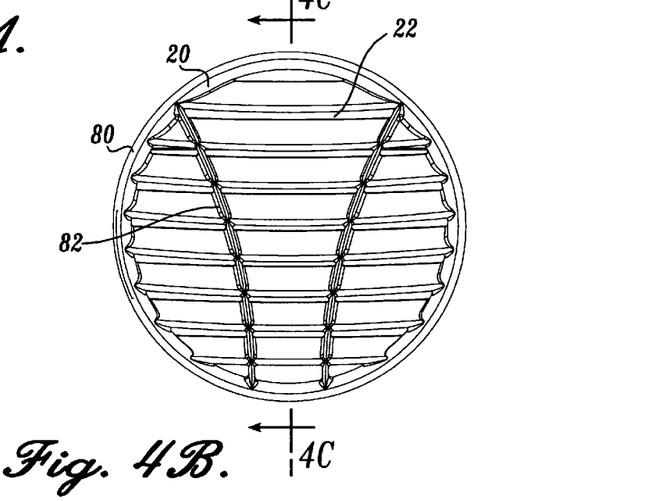
FIG. 4B is a top down plan view of the grill of FIG. 4A.
Figure 4C:
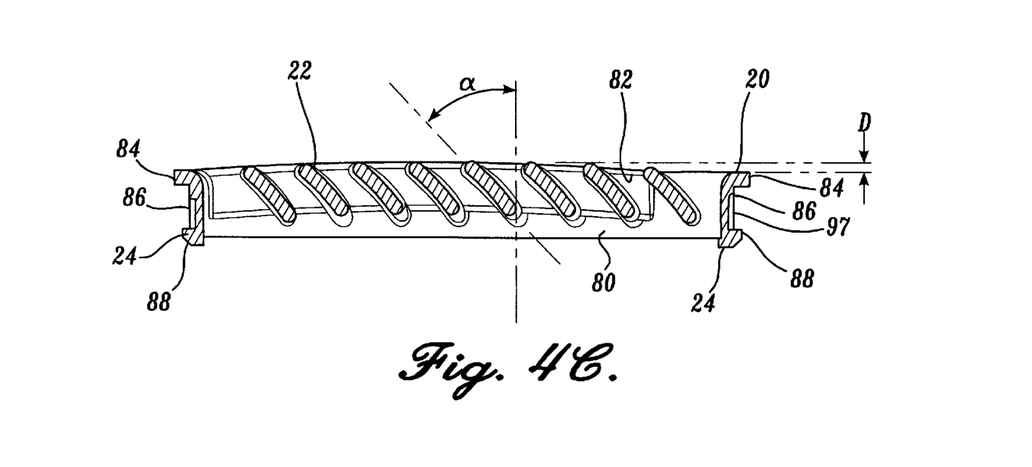
FIG. 4C is a cross-sectional view taken along line 4C—4C of FIG. 4A.

Referring the circular insert embodiment of FIGS. 4A–4C, the inserts include a circumferential structural member 80 and, preferably, a number of reinforcing cross members 82. The insert louvers 22 extend linearly across the area defined by the circumferential structural member 80 and through the reinforcing cross members 82. As stated above, the prongs 24 allow the circular inserts to be snap-locked into the housing openings. The upper edge of the circumferential structural member includes an outwardly extending lip 84 and a short rigid skirt 86 normal to the lip 84. The skirt has notches 97 located about its outward exterior surface. The prongs 24 are formed by small arcuate portions of the skirt that are separate from the remainder of the skirt 86. Each prong includes a foot 88 that extends radially outward from the prong defined by the diameter of the skirt. This feature is shown best in FIG. 4C.

Referring back to FIG. 2C, the front plate openings 18 corresponding to the circular inserts have a first circular recess 90 diametrically sized to accommodate the insert lip 84. The opening 18 further includes a second recess 92 located below the first circular recess and sized with a smaller diameter than the first circular recess diameter in order to closely fit the insert skirt 86. The area 94 below the second recess 92 has a diameter that is larger than the second recess diameter. When the circular insert 20 is pushed into an opening 18, the prong foot 88 bends inward to clear the second recess 92 and then snaps outward once the foot reaches the diametrically larger area 94 beneath the second recess. Thus, the foot and the circular insert 20 are secured in the opening 18. As with the other components, the circular inserts are single pieces, injection molded from a suitably rigid plastic.

Referring to FIGS. 1 and 2A, the housing openings 18 optionally include a detent 96 that extends from the opening surfaces radially inward. The detent 96 is sized to fit the notches 97 located along the skirt. In the embodiment shown, the detent is formed as a tab located at one end of a small arcuate piece. The piece is attached circumferentially to the opening at the piece's opposite end. The arcuate piece acts as a spring in order to facilitate movement of the detent between notches during rotation of the insert. Other detent configurations are possible. For example, the detent may be formed as a tab extending inwardly directly from the opening surface. Alternatively, the detent may be positioned on the insert with the notches located in the opening. The detent 96 and notches give the user an immediate tactile and auditory response that the inserts are securely positioned during installation and use.

Referring back to FIG. 4C, the circular inserts louvers 22 are positioned at an angle α of an amount in the range of about 10 degrees to about 50 degrees from vertical, a preferred angle α being 45 degrees. In addition, each louver has a cross-sectionally curved shape. This feature results in directing more air flow in a particular direction. When air hits a conventional straight louvers that is angled away from vertical, the air tends to hit the angled louver and bounce off at an angle of reflection that is equal to the angle of incident. The curved louvers of the present invention encourage the air flow to bend and actually flow in a direction that is more similar to the exit direction of the louver.

Still referring to FIG. 4C, the louvers of the circular inserts are additionally curved slightly outward in going from the circumferential structural member to the middle of the louvers. This curvature is represented by the distance, D. During use, the circular inserts can be rotated 360 degrees in order to direct the insert louvers, and hence the issuing air, in a desired direction.

Figure 5C:
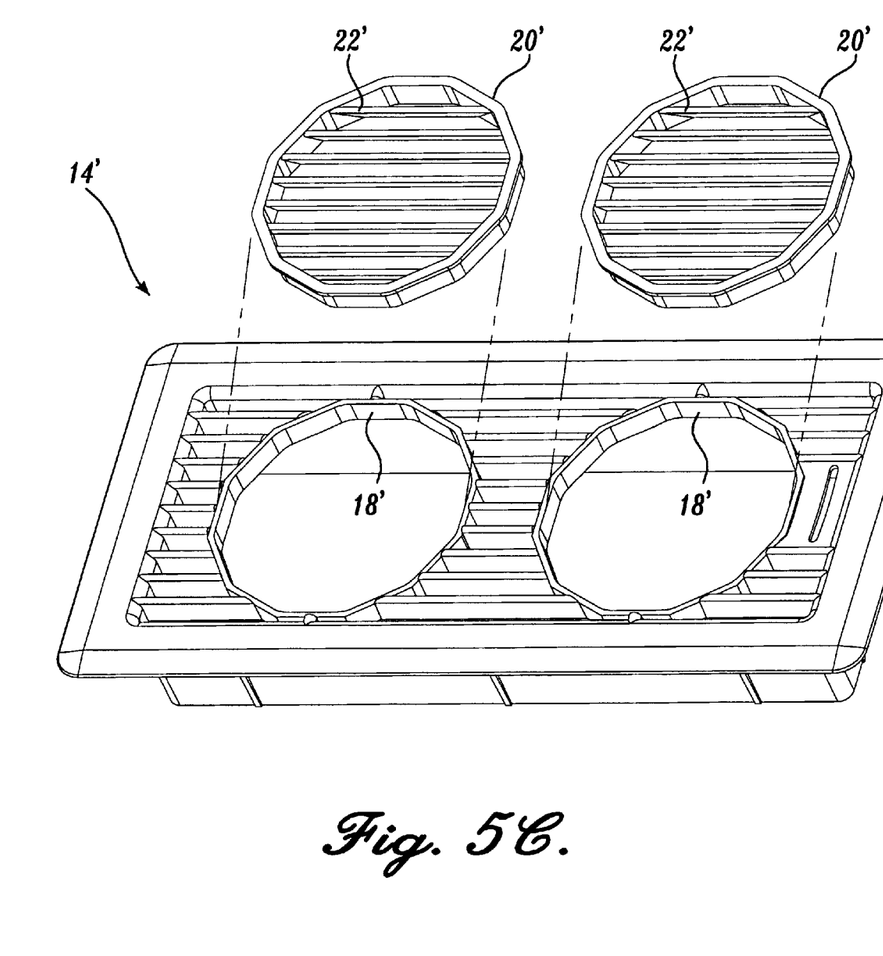
FIG. 5C is an alternative embodiment of an airway vent housing formed in accordance with the present invention.

Referring to FIG. 5C, an alternative embodiment of an airway vent housing 14' formed in accordance with the present invention is shown in which inserts 20' are formed of multiple linear-sided shapes instead of arcuate or circular shapes. The inserts 20' are snap fit into correspondingly shaped openings 18'. The inserts 20' may be removed, rotated, and reinserted, but are not capable of being rotated while inserted in the openings 18'. Louvers 22' are straight slats, positioned to receive or expel air at an angle. The snap-lock of inserts 20' are accomplished using conventional snap fit geometries, e.g., the inserts may be held by friction, by a small lip or tab extending from the opening into the insert (or vice versa, from the insert into the opening), etc.

As will be appreciated from a reading of the above, the present invention vent 12 provides improved airflow directional control and is easier to manufacture and assemble. By forming all components of injection molded plastic, the inserts 20, dampers 26, and damper switch 28 are easily installed in the housing 14. Assembly is easy and inexpensive because no screws, rivets, or other attachment components are required. Plastic has the further advantage of allowing color coordination without the need for painting. The circular insert protruding prongs 24 and the switch slot ridges give the user an immediate tactile and auditory response that the components are properly placed during installation and use.

Another benefit of the vent 12 is the unique shape of the insert louvers 22. Because the preferred insert louvers are curved in their cross-sectional shape, the air is more likely to go in the direction desired by the user. The outward curvature of the entire insert allows the user to more easily grip the insert face to rotate and improves the airflow directional control as well.

While the preferred embodiment of the invention has been illustrated and described, it will be appreciated that various changes can be made therein without departing from the spirit and scope of the invention. For example, the housing may be formed with more or less than two grills and two dampers. Further, while the vent described herein may be used successfully in a multitude of application, such as building ceiling and walls, aircraft and train seat air holes, etc. Hence, within the scope of the appended claims, it is to be understood that the invention can be practiced otherwise than as described herein.

The embodiments of the invention in which an exclusive property or privilege is claimed are defined as follows:

1. An air vent comprising:

(a) a rectangular planar housing having a front plate with a switch slot located near one end, and a flange extending normally from the front plate and including a guide slot having a plurality of ridges;

(b) a damper switch including an upright plate with a finger tab extendable through the switch slot and at least one guide positionable in the guide slot; and (c) at least one damper rotatably connected between opposed housing flanges and movably connected to the upright plate, wherein the vent is opened and closed by operation of the finger tab and is held in distinct positions by location of the guide in the guide slot between adjacent ridges.

2. The air vent formed according to claim 1, wherein the housing, the at least one damper, and the damper switch are injection molded plastic components.

3. The air vent formed according to claim 1, wherein the damper switch includes a damper pin slot and the at least one damper includes an end plate and a pin located radially outward on the end plate, the pin being in movably engaged with the damper pin slot.

4. The air vent formed according to claim 1, wherein the at least one damper includes two dampers, each damper having a flat planar body.

5. An air vent comprising:

(a) a housing including a front plate having at least one opening, a switch slot, and a flange extending outward from the front plate;

(b) at least one insert snap-locked into the at least one housing opening, each insert including a plurality of louvers;

(c) at least one damper rotatably connected to the housing; and (d) a damper switch having a finger tab extending through the switch slot, whereby the vent is opened and closed by operation of the finger tab;

wherein the damper switch includes an upright plate connected to the at least one damper, a guide extending outward from the upright plate, and a damper pin slot; wherein the flange includes a guide slot within which the damper switch guide is held, the guide slot having a series of ridges; and wherein the at least one damper includes an end plate and a pin located radially outward on the end plate, the pin being in movably engaged with the damper pin slot; and wherein the housing, the at least one insert, the at least one damper, and the damper switch are all injection molded plastic components.

6. The air vent formed according to claim 5, wherein the louvers have a curved cross-sectional shape, each louver being angularly positioned relative to the upright direction of the vent at an angle in the range of about 10 degrees to 50 degrees from vertical.

7. The air vent formed according to claim 5, wherein the at least one opening is two openings and the at least one insert is two inserts.

8. The air vent formed according to claim 5, wherein the at least one opening is three openings and the at least one insert is three inserts.

9. The air vent formed according to claim 5, wherein the at least one opening includes multiple linear sides.

10. The air vent formed according to claim 5, wherein the at least one opening is circular.

11. A heating and cool air vent comprising;

(a) a housing including a front plate having a switch slot and a flange;

(b) a number of circular openings in the housing, each opening having at least one detent and each insert including a plurality of notches engagable with the at least one detent during use;

(c) a plurality of rotatable circular inserts snap-locked into the housing openings, each insert including a plurality of louvers having a curved cross-sectional shape, each louver being angularly positioned relative to the upright direction of the vent;

(d) at least one damper rotatably connected to the housing; and (e) a damper switch having a finger tab extending through the switch slot, whereby the vent is opened and closed by operation of the finger tab; wherein the housing, the circular inserts the at least one damper, and the damper switch are all injection molded plastic components;

wherein the damper switch further includes an upright plate connected to the at least one damper, a guide extending from the upright plate, and a damper pin slot; wherein the flange includes a guide slot within which the damper switch guide is held, the guide slot having a series of ridges; and wherein the at least one damper includes an end plate and a pin located radially outward on the end plate, the pin being in movably engaged with the damper pin slot.

12. The air vent formed according to claim 11, wherein the louvers are positioned at an angle in the range of about 10 degrees to 50 degrees from vertical.

* * * * *